July 16, 1935. C. ROTTUM 2,008,156
COFFEEPOT
Filed July 28, 1930
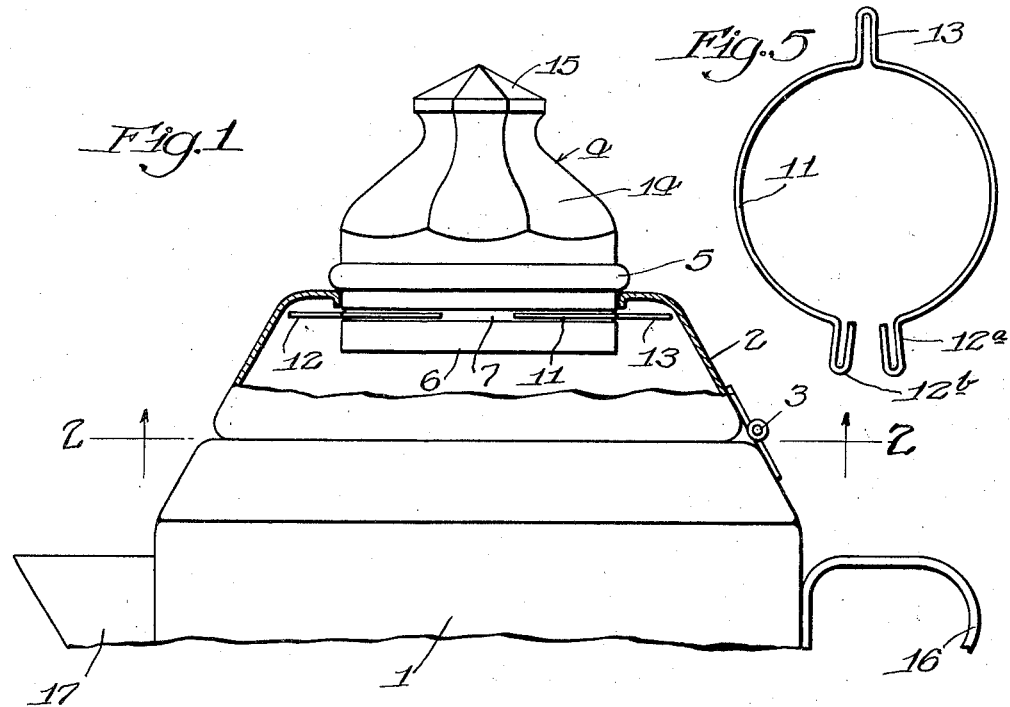
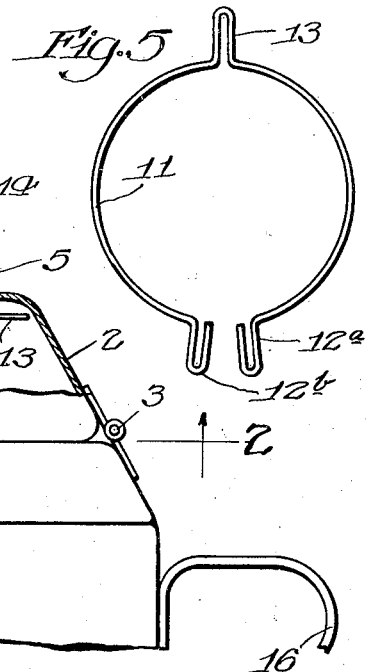
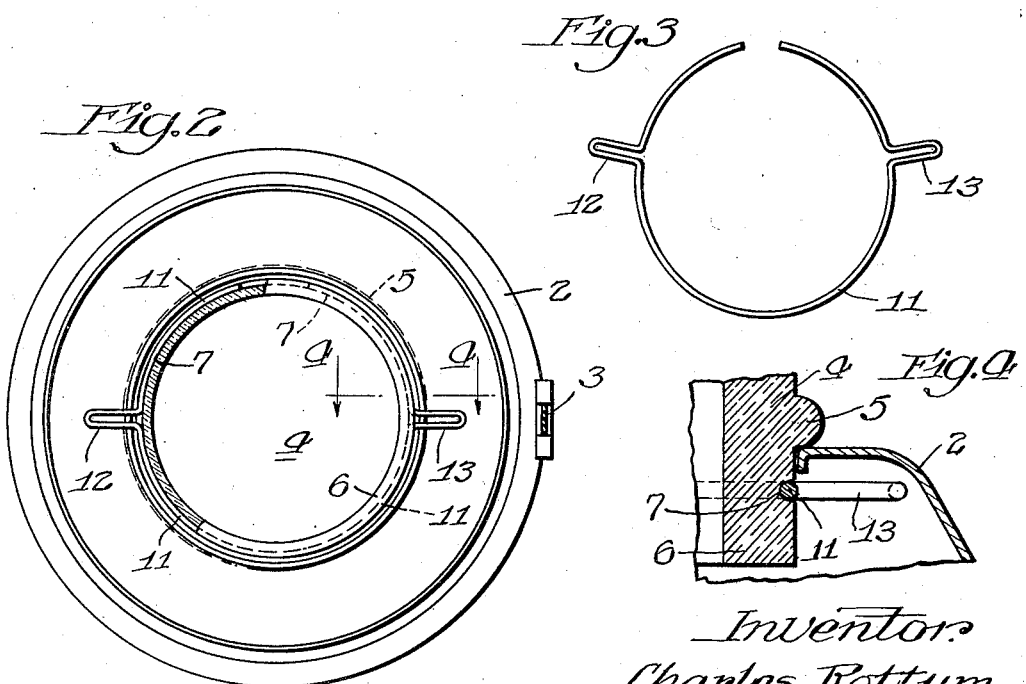
Inventor:
Charles Rottum
By Parker & Carter
Attys.

Patented July 16, 1935

2,008,156

UNITED STATES PATENT OFFICE 2,008,156

COFFEEPOT

Charles Rottum, Chicago, Ill., assignor of one-third to Donald M. Carter, Chicago, Ill.

Application July 28, 1930, Serial No. 471,150

4 Claims. (Cl. 53—3)

This invention relates to coffee pots, particularly of the type used as percolators, and has for its object to provide a new and improved device of this description.

Such coffee pots or percolators have a lid with a transparent section at the top so that the action of the percolator may be ascertained without opening the cover. This section, which is made of frangible material, often falls off when the coffee is poured and may be, itself broken and may also break the coffee cup and saucer, thus causing the coffee to be spilled, in addition to damaging the parts.

This invention has as a further object to provide a simple construction for preventing this top section from falling off when the coffee is poured. The invention has further objects which are more particularly pointed out in the accompanying description.

Referring now to the drawing, Fig. 1 is a view showing the coffee pot with parts broken away illustrating one form of the invention;

Fig. 2 is a sectional view taken on the line 2—2 of Fig. 1;

Fig. 3 is a view with a fastening device for the top section.

Fig. 4 is a fragmentary sectional view taken on the line 4—4 of Fig. 2.

Fig. 5 is a view showing a modified construction of the holding device.

Like numerals refer to like parts throughout the several figures.

As illustrated in the drawing, I have shown a coffee pot 1 with a lid 2 hinged to the pot by the hinge 3. The lid is provided with an opening at the top into which is received the glass section 4. This glass section is provided with a laterally extending annulus 5 which rests on the top of the coffee pot lid and which prevents the top section from falling into the coffee pot. It is also provided with a downwardly projecting portion 6 below the annulus 5 which projects into the opening in the coffee pot lid. The downwardly projecting portion 6 is provided with a groove 7 which extends therearound on the exterior thereof.

A holding device 11 is removably connected with the glass section 4 and the lid 2, so as to hold the glass section in position when the coffee pot is tilted to pour out the coffee. In the construction shown, the holding device 11 is made from a spring wire with the looped portions 12 and 13, the ends of the wire being preferably disconnected, as shown in Fig. 5. When the holding device is to be used, the glass section 4 is inserted in the lid, the lid being open at the time, and the spring wire holding device is placed in the groove on the downwardly projecting portion 6 of the lid, the ends of the wire being sprung apart to permit this. Since the wire is of spring wire, it will, when released, spring into this groove so as to be held therein, as clearly shown in Figs. 1 and 2. The looped portions 12 and 13 project beyond the edge of the hole in the lid, as clearly shown in Figs. 1 and 2. When this holding device is in this position, it will be seen that the glass top cannot fall off when the coffee is poured.

When it is desired to remove the glass top for washing or for any other reason, it is only necessary to take hold of the loops 12 and 13 and move the ends of the wire apart so as to enlarge the enclosing space, and then remove it from the groove 7. The glass section 4 can then be removed and washed and again replaced, as above set out.

It will be seen that I have here a simple, cheap and efficient holding device, which will hold the glass top in position and absolutely prevent it from falling out when the coffee is poured, thus preventing breakage of the cup and saucer and the glass top, and the injury done by the spilling of the coffee.

The glass top 4 may be of any suitable description. I prefer, however, to have a glass top provided with corrugations 14. I also prefer to provide the glass top 4 with the ornamental hand piece 15. I may also make the glass top 4 ornamental in other ways, as for example by using colored glass. The color, however, should not be sufficient to prevent the coffee from being seen through the glass. The body portion and the lid are of opaque material, preferably metal. The body is provided with a handle 16 and a spout 17. It will be noted that it is not necessary to insert the top portion 4 when it is in any particular position, as it can be inserted when in any position and can be rotated when in position completely around without disconnecting it and without danger of its removal.

In Fig. 5 I have shown the holding device 11 in which the separation of the wire is made at one of the loops. In this construction, instead of the loop 12, the wire is severed as shown, and the ends bent to form the loops 12a and 12b. In applying the device to the glass top, the loops 12a and 12b are grasped by the fingers and separated, and then when the device is placed over the projection on the glass top, they are released and the wire fits into the groove 7. This makes it easier to connect and disconnect the wire to the glass top.

I claim:

1. A removable top piece for coffee pot covers comprising a body portion, an annulus extending therearound, a projecting cylindrical portion which projects beyond said annulus and which is provided with a groove extending therearound at a distance from the annulus, a removable holding wire with separated ends, fitting into said groove, adapted to be placed in position after the top piece is in position, the outer face of said wire being substantially flush with the outer face of said projecting portion and loops in the wire on opposite sides of the projecting portion, which project outwardly beyond the face of the projecting cylindrical portion and which engage the under side of the coffee pot cover to hold the top piece in position.

2. A coffee pot cover comprising a metal cover piece having a central opening therein, a glass top piece separate from said metal cover piece having an annulus extending therearound for engaging the edge of the metal cover piece around the said central opening, said glass top piece having a projecting portion which projects into said central opening and which extends beyond the inner face of the metal cover piece, said projecting portion having a groove extending therearound below the edge portion of the metal cover piece which surrounds said central opening, a removable wire fitting into said groove the outer face of the wire being substantially flush with the outer face of said projecting portion and being placed in said groove after the said top piece is placed in position, said wire being provided with horizontally extending loops opposite each other, which project outwardly under the edge of the metal cover piece and prevent the accidental displacement of said glass top piece.

3. A removable top piece for coffee pot covers comprising a body portion an annulus extending therearound, a projecting cylindrical portion which projects beyond the annulus, said projecting portion being provided with a groove extending therearound at a distance from the annulus, there being a smooth surface on said projecting portion between the top of the groove and the bottom of said annulus and extending entirely around said projecting portion and a smooth surface on said projecting portion between the bottom of said groove and the end of said projecting portion extending entirely around said projecting portion a removable holding wire fitting into said groove adapted to be placed in position after the top piece is in position, said wire being substantially flush with the outer face of said projecting portion, and loops in the wire on opposite sides of the projecting portion, which project outwardly from the cylindrical portion and which engage the coffee pot cover to hold said top piece in position.

4. In combination with a metal coffee pot cover having a central opening therein, a glass top separate from said metal cover, said glass top closing said central opening, said glass top having an annulus extending therearound for engaging said metal cover around said central opening, said glass top having a projecting portion which projects into said central opening and which extends beyond the inner face of the metal cover, said projecting portion having a groove extending therearound and said groove being spaced below said annulus and said metal cover, a removable spring wire fitting into said groove and being placed in said groove after the said glass top is placed in said central opening, said wire being provided with laterally extending loops spaced from each other and which project outwardly under the metal cover and prevent the accidental displacement of said glass top.

CHARLES ROTTUM.